United States Patent
Calhoun et al.

(10) Patent No.: US 7,238,423 B2
(45) Date of Patent: Jul. 3, 2007

(54) MULTICOMPONENT FIBER INCLUDING ELASTIC ELEMENTS

(75) Inventors: Patricia Hwang Calhoun, Alpharetta, GA (US); Chad Isaac Medlock, LaGrange, GA (US); Roland Columbus Smith, Jr., Gainesville, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 173 days.

(21) Appl. No.: 11/017,984

(22) Filed: Dec. 20, 2004

(65) Prior Publication Data
US 2006/0135021 A1   Jun. 22, 2006

(51) Int. Cl.
*D02G 3/00* (2006.01)

(52) U.S. Cl. ............ 428/373; 428/364; 428/365; 428/398; 442/328; 442/329; 442/364; 442/381; 442/394

(58) Field of Classification Search ............... 428/398, 428/373, 364, 365; 442/329, 364, 381, 394, 442/328
See application file for complete search history.

(56) References Cited

U.S. PATENT DOCUMENTS

| | | | |
|---|---|---|---|
| 3,081,490 A | 3/1963 | Heynen et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,855,046 A | 12/1974 | Hansen et al. | |
| 4,265,972 A * | 5/1981 | Rudner | 428/392 |
| 4,340,563 A | 7/1982 | Appel et al. | |
| 4,370,114 A | 1/1983 | Okamoto et al. | |
| 4,406,850 A | 9/1983 | Hills | |
| 4,713,291 A | 12/1987 | Sasaki et al. | |
| 4,875,844 A | 10/1989 | Nakajima et al. | |
| 4,990,158 A | 2/1991 | Kaplan et al. | |
| 5,108,820 A | 4/1992 | Kaneko et al. | |
| 5,153,066 A | 10/1992 | Tanaka et al. | |
| 5,162,074 A | 11/1992 | Hills | |
| 5,272,236 A | 12/1993 | Lai et al. | |
| 5,278,272 A | 1/1994 | Lai et al. | |
| 5,320,512 A | 6/1994 | Moore, Sr. | |
| 5,332,613 A | 7/1994 | Taylor et al. | |
| 5,336,552 A | 8/1994 | Strack et al. | |
| 5,344,297 A | 9/1994 | Hills | |
| 5,382,400 A | 1/1995 | Pike et al. | |
| 5,437,899 A * | 8/1995 | Quigley | 428/35.7 |

(Continued)

FOREIGN PATENT DOCUMENTS

JP   58091805 A   5/1983

(Continued)

OTHER PUBLICATIONS

Patent Abstracts of Japan, JP 02191717, Jul. 27, 1990, TOYOBO Co Ltd.

*Primary Examiner*—Norca L. Torres Velazquez
(74) *Attorney, Agent, or Firm*—Robert A. Ambrose

(57) ABSTRACT

Disclosed herein are multicomponent fibers, and particularly sheath-and-core type multicomponent fibers including elastic polymers. The multicomponent fibers have at least three cross sectional elements, wherein a first cross sectional element is an outer sheath element, the second cross sectional element is an inner sheath element, and the third cross sectional element may be either a hollow element or a filled core element.

20 Claims, 1 Drawing Sheet

U.S. PATENT DOCUMENTS

| | | | |
|---|---|---|---|
| 5,539,056 | A | 7/1996 | Yang et al. |
| 5,562,930 | A | 10/1996 | Hills |
| 5,596,052 | A | 1/1997 | Resconi et al. |
| 5,869,181 | A | 2/1999 | Kent et al. |
| 5,904,982 | A | 5/1999 | Kent et al. |
| 5,989,004 | A | 11/1999 | Cook |
| 6,017,478 | A | 1/2000 | Kent et al. |
| 6,342,298 | B1 | 1/2002 | Evans et al. |
| 6,350,399 | B1 | 2/2002 | Cook et al. |
| 6,376,072 | B1 | 4/2002 | Evans et al. |
| 6,541,403 | B2 * | 4/2003 | Billarant et al. ............ 442/364 |
| 6,623,854 | B2 | 9/2003 | Bond |
| 6,746,226 | B2 | 6/2004 | Moore |
| 2003/0207110 | A1 | 11/2003 | Matsui et al. |

FOREIGN PATENT DOCUMENTS

| | | | |
|---|---|---|---|
| JP | 84032562 | B | 8/1984 |
| JP | 87029524 | B | 6/1987 |
| JP | 62299514 | A | 12/1987 |
| JP | 1266218 | A | 10/1989 |
| JP | 3249213 | A | 11/1991 |
| JP | 3287848 | A | 12/1991 |
| JP | 7243118 | A | 9/1995 |
| JP | 7305217 | A | 11/1995 |
| JP | 8060486 | A | 3/1996 |
| JP | 8209484 | A | 8/1996 |
| JP | 9013261 | A | 1/1997 |
| JP | 10018128 | A | 1/1998 |
| JP | 2717306 | B2 | 2/1998 |
| JP | 2803165 | B2 | 9/1998 |
| JP | 2807058 | B2 | 9/1998 |
| JP | 11140723 | A | 5/1999 |
| JP | 2965207 | B2 | 10/1999 |
| JP | 3212883 | B2 | 9/2001 |
| WO | WO 89/02938 | | 4/1989 |
| WO | WO 00/44411 | | 8/2000 |
| WO | WO 02/59404 | | 8/2002 |
| WO | WO 02/66715 | | 8/2002 |
| WO | WO 2004/044288 | | 5/2004 |

* cited by examiner

MULTICOMPONENT FIBER INCLUDING ELASTIC ELEMENTS

FIELD

The present invention is related to multicomponent fibers and particularly to sheath-and-core type multicomponent fibers comprising elastic polymers.

BACKGROUND OF THE INVENTION

Many of the medical care garments and products, protective wear garments, mortuary and veterinary products, and personal care products in use today are partially or wholly constructed of extruded filamentary or fibrous web materials such as nonwoven web materials. Examples of such products include, but are not limited to, medical and health care products such as surgical drapes, gowns and bandages, protective workwear garments such as coveralls and lab coats, and infant, child and adult personal care absorbent articles such as diapers, training pants, disposable swimwear, incontinence garments and pads, sanitary napkins, wipes and the like. Other uses for nonwoven web materials include veterinary and mortuary products and materials, geotextiles and house wrap materials. For these applications nonwoven web materials provide functional, tactile, comfort and/or aesthetic properties that can approach or even exceed those of traditional woven textiles or knitted cloth materials.

The composition of the fibers in a fabric such as a nonwoven web has a significant impact on the functional, tactile, comfort and/or aesthetic properties of the fabric or material. As an example, the fibers of nonwoven webs are often made of or include one or more thermoplastic polymers having different physical properties that can affect the properties of the web material. For example, nonwoven web materials made from elastic polymer fibers may desirably impart properties of stretch and recovery, which can provide for articles or selected portions of articles having improved wearer body fit or body conformance.

However, elastic polymers and fibers and fabrics made from elastic polymers tend to have unpleasant tactile aesthetic properties, such as feeling rubbery or tacky to the touch, making them unpleasant and uncomfortable against a wearer's skin. Nonwoven webs and fibers made from non-elastic polymers, on the other hand, tend to feel more cloth-like to the skin, having better tactile, comfort and aesthetic properties. Therefore, it would be desirable to be able to make elastic-containing elements of nonwoven fabrics which have improved tactile or skin-feel aesthetics. In addition, because nonwoven materials are often utilized in limited- or single-use disposable products, and elastic polymers generally are considerably more expensive than the non-elastic polymers typically used in nonwoven materials, there remains a need for reducing the cost of producing elastic-containing elements of nonwoven fabrics.

SUMMARY OF THE INVENTION

The invention provides for multicomponent sheath-and-core type fibers containing thermoplastic elastic polymers. In one embodiment, there is provided a multicomponent fiber including at least first, second and third cross sectional elements, where the first cross sectional element is an outer sheath, the second cross sectional element is an inner sheath arranged adjacent to the outer sheath and adjacent to the third cross sectional element, where the outer sheath includes a thermoplastic polymeric composition and the inner sheath includes a thermoplastic elastic polymeric composition. The outer sheath element may include a thermoplastic elastic polymeric composition or substantially inelastic thermoplastic polymeric composition. In embodiments, the third cross sectional element may desirably be a filled core element which includes either an elastic or substantially inelastic thermoplastic polymeric composition. In other embodiments, the third cross sectional element may desirably be a hollow element, that is, a central cross sectional element of the fiber which is substantially devoid of polymeric composition.

The thermoplastic elastic polymeric composition for the first, second and/or third cross sectional elements may each independently be selected from elastic polymers such as elastic polyesters, elastic polyurethanes, elastic polyamides, elastic copolymers of ethylene and at least one vinyl monomer, elastic block copolymers, elastic polyolefins, and blends thereof. The first cross sectional element and/or third cross sectional element may desirably comprise one or more substantially inelastic polymeric compositions, such as for example polyolefins such as polypropylene, polyethylene, or copolymers of polyolefins, polyamides, and the like. In still other embodiments, the multicomponent fiber may be configured so that the first cross sectional element or outer sheath represents a reduced amount of the cross sectional area of the entire fibers, such as by being less than about 50 percent of the cross sectional area, or less than about 35 percent of the cross sectional area, or even less than about 20 percent of the cross sectional area of the multicomponent fiber. Also provided herein are nonwoven webs or nonwoven fabrics which include the multicomponent fibers of the invention.

DEFINITIONS

Figure 1:
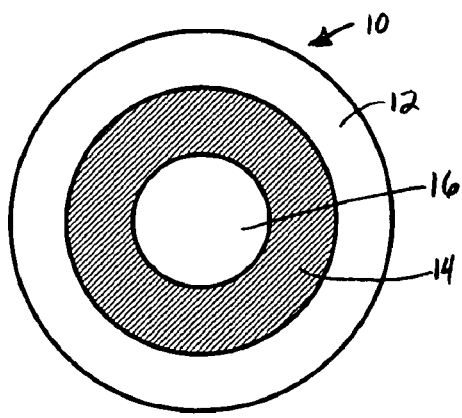
FIGS. 1–6 illustrate schematically cross sectional element configurations in the multicomponent fibers of the invention.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein the term "elastic polymer" or "elastic polymeric composition" is generally used to refer to a material that, upon application of a force, is stretchable to a stretched, biased length which is at least about 133%, or one and a third times, its relaxed, unstretched length, and which upon release of the stretching, biasing force will recover at least about 50% of its elongation. By way of example only, an elastic material having a relaxed, unstretched length of 10 centimeters may be elongated to at least about 13.3 centimeters by the application of a stretching or biasing force. Upon release of the stretching or biasing force the elastic material will recover to a length of not more than 11.65 centimeters.

As used herein the term "fibers" refers to both staple length fibers and substantially continuous filaments, unless otherwise indicated. As used herein the term "substantially continuous" with respect to a filament or fiber means a filament or fiber having a length much greater than its diameter, for example having a length to diameter ratio in excess of about 15,000 to 1, and desirably in excess of 50,000 to 1.

As used herein the term "monocomponent" filament refers to a filament or fiber formed from one or more extruders using only one polymeric composition. This is not meant to exclude filaments formed from one polymer to which small amounts of additives have been added for color, anti-static properties, lubrication, hydrophilicity, etc.

As used herein the term "multicomponent fibers" refers to fibers that have been formed from at least two component polymers or polymeric compositions, or the same polymer with different properties or additives, extruded from separate extruders but spun together to form one fiber. Multicomponent fibers are also sometimes referred to as conjugate fibers or bicomponent fibers, although more than two polymeric compositions may be used. The cross sectional elements representing the components of the multicomponent fibers are arranged in substantially constantly positioned distinct zones across the cross-section of the multicomponent fibers, and the cross sectional elements extend substantially continuously along the length of the multicomponent fibers. The configuration of such a multicomponent fiber may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section fiber, or other. Multicomponent fibers are taught in U.S. Pat. No. 5,108,820 to Kaneko et al., U.S. Pat. No. 5,336,552 to Strack et al., and U.S. Pat. No. 5,382,400 to Pike et al., incorporated herein by reference in their entireties. For two component fibers, the polymers may be present in ratios of 75/25, 50/50, 25/75 or any other desired ratios. In addition, any given component of a multicomponent fiber may desirably comprise two or more polymers as a multiconstituent blend component.

As used herein the term "biconstituent fiber" or "multiconstituent fiber" refers to a fiber or filament formed from at least two polymers, or the same polymer with different properties or additives, extruded from the same extruder as a blend. Multiconstituent fibers do not have the polymer components arranged in substantially constantly positioned distinct zones across the cross-section of the multicomponent fibers; the polymer components may form fibrils or protofibrils that start and end at random.

As used herein the term "nonwoven web" or "nonwoven fabric" means a web having a structure of individual fibers or fibers that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the fiber diameters useful are usually expressed in microns. (Note that to convert from osy to gsm, multiply osy by 33.91).

The term "spunbond" or "spunbond nonwoven web" refers to a nonwoven fiber or filament material of small diameter fibers that are formed by extruding molten thermoplastic polymer as fibers from a plurality of capillaries of a spinneret. The extruded fibers are cooled while being drawn by an eductive or other well known drawing mechanism. The drawn fibers are deposited or laid onto a forming surface in a generally random manner to form a loosely entangled fiber web, and then the laid fiber web is subjected to a bonding process to impart physical integrity and dimensional stability. The production of spunbond fabrics is disclosed, for example, in U.S. Pat. No. 4,340,563 to Appel et al., U.S. Pat. No. 3,692,618 to Dorschner et al., and U.S. Pat. No. 3,802,817 to Matsuki et al., incorporated herein by reference in their entireties. Typically, spunbond fibers or filaments have a weight-per-unit-length in excess of about 1 denier and up to about 6 denier or higher, although both finer and heavier spunbond fibers can be produced. In terms of fiber diameter, spunbond fibers often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin et al., incorporated herein by reference in its entirety. Meltblown fibers may be continuous or discontinuous, are often smaller than 10 microns in average diameter and are frequently smaller than 7 or even 5 microns in average diameter, and are generally tacky when deposited onto a collecting surface.

As used herein, "thermal point bonding" involves passing a fabric or web of fibers or other sheet layer material to be bonded between a heated calender roll and an anvil roll. The calender roll is usually, though not always, patterned in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a "Ramish" diamond pattern with repeating diamonds having a bond area of about 8% to about 14% and 52 bonds/square inch and a wire weave pattern looking as the name suggests, e.g. like a window screen. Typically, the percent bonding area varies from around 10% to around 30% of the area of the fabric or laminate web. Thermal point bonding imparts integrity to individual layers by bonding fibers within the layer and/or for laminates of multiple layers, point bonding holds the layers together to form a cohesive laminate.

DETAILED DESCRIPTION OF THE INVENTION

The present invention provides multicomponent fibers having at least three cross sectional elements which may be used, for example, in fibrous fabrics and materials such as in nonwoven webs. The invention will be described with reference to the following description and the figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

As stated, the multicomponent fibers of the invention comprise at least three distinct cross sectional elements. The cross sectional elements are substantially constantly positioned distinct "zones" across the cross section of the multicomponent fibers and extend substantially continuously along the length of the multicomponent fibers. The multicomponent fibers are arranged essentially as sheath-and-core fibers wherein a fiber's geometric configuration of elements is such that at least one cross sectional element is substantially completely surrounded by another cross sectional element. The three cross sectional elements are arranged as polymer containing first and second cross sectional elements which are, respectively, an outer and an inner sheath element, and a third cross sectional element inside of the inner sheath which may be either a hollow space (that is, substantially devoid of polymer) or a polymer-containing core element. Such a sheath-and-core multicomponent fiber having three cross sectional elements is shown in FIG. 1.

In FIG. 1, the multicomponent fiber generally designated 10 is shown in cross section. The multicomponent fiber 10 comprises a first cross sectional element 12 which is an outer sheath, a second cross sectional element 14 which is an inner sheath, and a third cross sectional element 16. The first cross sectional element or outer sheath 12 comprises a thermoplastic polymeric composition, and the second cross sectional element or inner sheath 14 comprises a thermoplastic elastic polymeric composition. As used herein, the term "thermoplastic polymeric composition" includes thermoplastic polymers which are elastic and thermoplastic polymers which are substantially inelastic. Therefore, while the second cross sectional element (inner sheath 14) must comprise an elastic polymeric composition, the first cross sectional element (outer sheath 12) may comprise inelastic or elastic thermoplastic polymeric compositions. As an example, the second cross sectional element (inner sheath 14) may comprise a high-performing elastic polymeric composition such as a thermoplastic polyurethane or a styrenic block copolymer, while the first cross sectional element (outer sheath 12) may comprise the same or another high-performing thermoplastic elastic polymeric composition.

Alternatively, the first cross sectional element (outer sheath 12) of multicomponent fiber 10 may comprise a lower performance thermoplastic elastic polymeric composition such as, for example, a composition comprising polyolefin elastic polymers. As still another alternative, the first cross sectional element (outer sheath 12) may desirably comprise a thermoplastic substantially inelastic polymeric composition. As will be recognized by those skilled in the art of synthetic fibers and nonwoven materials, elastic polymers tend to have less pleasant tactile aesthetics than inelastic polymers, such as by feeling rubbery or tacky against the skin rather than feeling smooth. By sheathing or covering the elastic polymeric composition in an inelastic polymer, it is possible to reduce the tacky feeling of the fiber or produce a fiber having substantially no surface tackiness. However, it should be noted that such an inelastic-sheathed multicomponent fiber may have reduced elastic performance, and indeed may be relatively inelastic until the fiber (and thus the inelastic sheath) has been stretched at least once.

As shown in FIG. 1, the multicomponent fiber 10 further includes third cross sectional element 16 which, for the embodiment shown in FIG. 1, is a hollow element. That is, for the embodiment of multicomponent fiber 10 shown in FIG. 1, the multicomponent fiber comprises outer and inner sheath comprising polymeric compositions, but the centermost portion of the cross sectional area of the fiber, which is third cross sectional element 16, is a hollow space sheathed or surrounded by second cross sectional element 14. This third cross sectional hollow element 16 is substantially devoid of polymeric composition, and runs as a hollow space substantially along the length of the multicomponent fiber. As stated, the hollow element is substantially devoid of fiber, but desirably, the hollow space of third cross sectional element 16 may hold one or more gases such as for example air, nitrogen, carbon dioxide, or one or more inert gases. By having the third cross sectional element 16 be a hollow space, the amount of the relatively expensive thermoplastic elastic polymeric composition may be substantially reduced, compared to a fiber having the same diameter of second cross sectional element 14 which diameter is completely filled with an elastic polymer composition.

Figure 2:
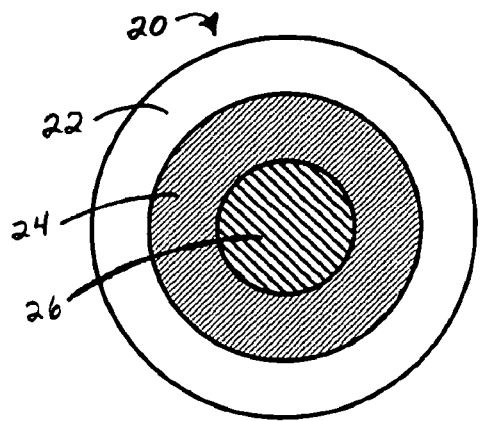

Shown in FIG. 2 is another sheath-and-core type multicomponent fiber 20 comprising first cross sectional element 22 which is an outer sheath, second cross sectional element 24 which is an inner sheath, and third cross sectional element 26. As in multicomponent fiber 10 in FIG. 1, first cross sectional element or outer sheath 22 comprises a thermoplastic polymeric composition and the second cross sectional element or inner sheath 24 comprises a thermoplastic elastic polymeric composition. However, for the embodiment shown in FIG. 2, the third cross sectional element 26 of multicomponent fiber 20 is a filled core element rather than a hollow space element as in multicomponent fiber 10. The third cross sectional element or core element 26 of fiber 20 may comprise a thermoplastic elastic polymeric composition, which may be the same thermoplastic elastic polymeric composition comprised by second cross sectional element or inner sheath 24, but is desirably a different thermoplastic elastic polymeric composition than the composition of inner sheath 24. As an example, one of the second cross sectional element (inner sheath 24) and third cross sectional element (filled core 26) may comprise a high-performing thermoplastic elastic polymeric composition, while the other element may comprise a lower performance (and less expensive) thermoplastic elastic polymeric composition, such as for example a less expensive commercial thermoplastic polymer, or elastic polymer recycled or reclaimed from previously spun elastic fiber. As another example, second cross sectional element (inner sheath 24) may comprise a thermoplastic elastic polymeric composition, while the third cross sectional element (filled core 26) may comprise a substantially inelastic thermoplastic polymeric composition. Also as described above, the first cross sectional element (outer sheath 22) may comprise either an elastic or a substantially inelastic thermoplastic polymeric composition.

Figure 3:
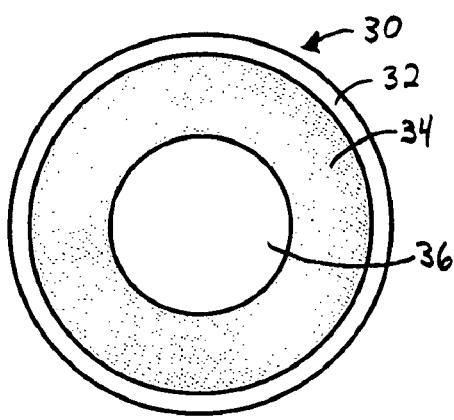
Figure 4:
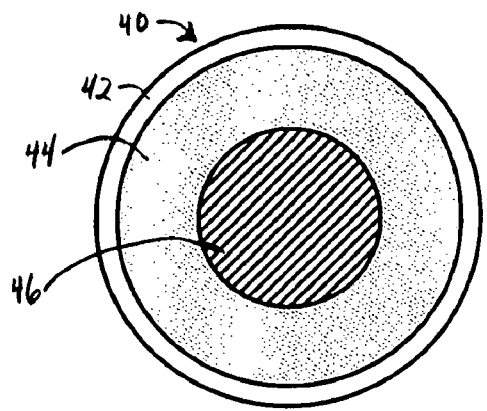

Turning to FIG. 3 and FIG. 4, there are shown, respectively, fibers 30 and 40 which may be similar to the fibers 10 and 20 shown in FIGS. 1 and 2. Multicomponent fiber 30 in FIG. 3 comprises first cross sectional element 32 which is an outer sheath, second cross sectional element 34 which is an inner sheath, and third cross sectional element 36 which, as depicted in FIG. 3, is a hollow space element. Multicomponent fiber 40 in FIG. 4 comprises first cross sectional element 42 which is an outer sheath, second cross sectional element 44 which is an inner sheath, and third cross sectional element 46 which, as depicted in FIG. 4, is a filled core element. However, in the embodiments shown in FIGS. 3 and 4, the fibers 30 and 40 have substantially reduced first cross sectional elements (outer sheaths 32, 42 respectively) compared to the fibers shown in FIGS. 1 and 2. The first, second and third cross sectional elements of multicomponent fibers 30 and 40 may comprise any of the thermoplastic polymeric compositions or combinations of compositions as are described above with respect to fibers 10 and 20 in FIGS. 1 and 2. That is, the second cross sectional element or inner sheath (34 or 44 in FIG. 3 or FIG. 4) will comprise a thermoplastic elastic polymeric composition and the first cross sectional element or outer sheath (32 or 42 in FIG. 3 or FIG. 4) will comprise a thermoplastic polymeric composition which may be an inelastic or an elastic composition, and third cross sectional element (inner filled core element 46) will comprise a thermoplastic polymeric composition which may be an inelastic or an elastic composition.

By reducing the first cross sectional element of the multicomponent fibers 30 and 40 relative to the other cross sectional elements, it is possible to reduce the effects of the specific properties of one thermoplastic polymeric composition relative to another. For example, in certain embodiments described above the second and/or third cross sectional elements comprise thermoplastic elastic polymeric compositions but the first cross sectional element comprises substantially inelastic thermoplastic polymeric composition, in order to reduce surface tackiness of the multicomponent fiber. In those embodiments, it may be highly desirable to mitigate the effects on elastic performance attributable to the inelastic sheath by having the first cross sectional element or outer sheath element be relatively thin compared to the elastics-containing element(s) of the multicomponent fiber.

Figure 5:
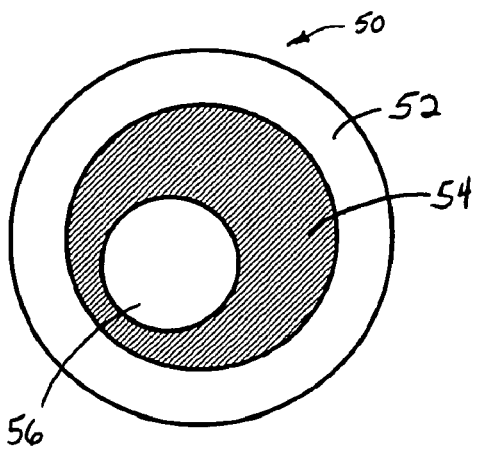
Figure 6:
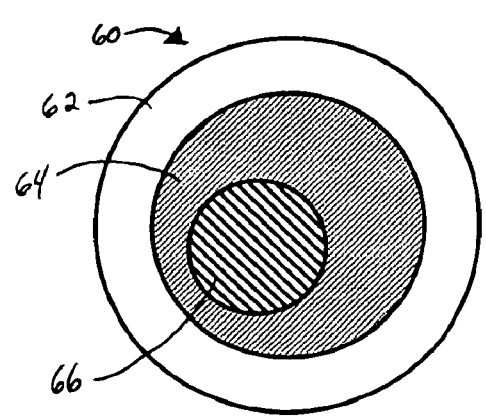

Other embodiments will be recognized by those skilled in the art. As examples, the multicomponent fibers shown in FIGS. 5 and 6 are similar to the embodiments depicted in FIGS. 1 and 2. Multicomponent fiber 50 in FIG. 5 comprises a first cross sectional element 52 which is an outer sheath, a second cross sectional element 54 which is an inner sheath, and third cross sectional element 56 which, as depicted in FIG. 5, is a hollow space element; Multicomponent fiber 60 in FIG. 6 comprises a first cross sectional element 62 which is an outer sheath, a second cross sectional element 64 which is an inner sheath, and third cross sectional element 66 which, as depicted in FIG. 6, is a is a filled core element. However, while the third cross sectional elements 14 and 26 shown in FIGS. 1 and 2 were substantially concentric or centered cross sectional elements, the third cross sectional elements 56 and 66 shown in FIGS. 5 and 6 are "eccentric" cross sectional elements. That is, the third cross sectional elements of multicomponent fibers 50 and 60 are purposefully offset from center. An offset or "eccentric" third cross sectional element may be desirable where it is desired to have the multicomponent fibers have a degree of fiber crimping or curling. The first, second and third cross sectional elements of multicomponent fibers 50 and 60 may comprise any of the thermoplastic polymeric compositions or combinations of compositions as are described above with respect to fibers 10 and 20 in FIGS. 1 and 2.

Polymers generally suitable for extrusion of fibers from a thermoplastic melt include the known polymers suitable for production of nonwoven webs and materials such as for example polyolefins, polyesters, polyamides, polycarbonates and copolymers and blends thereof. It should be noted that while the cross sectional elements of the multicomponent fiber have been described herein in some instances as the outer sheath "polymer" or inner sheath "polymer" or third cross sectional element (or core) "polymer", any of these multicomponent fiber cross sectional elements may be multiconsituent cross sectional elements that comprise more than one polymer. That is, the thermoplastic polymeric composition of any of these elements may desirably comprise a blend of polymers. It should also be noted that the polymer or polymers for any given cross sectional element may desirably contain other additives such as processing aids, and/or treatment compositions to impart desired properties to the fibers, and/or residual amounts of solvents, and/or pigments or colorants, and the like.

Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include poly lactide and poly lactic acid polymers as well as polyethylene terephthalate, poly-butylene terephthalate, polytetramethylene terephthalate, polycyclohexylene-1,4-dimethylene terephthalate, and isophthalate copolymers thereof, as well as blends thereof.

In addition, many elastic polymers are known to be suitable for forming fibers or filaments, and, as stated above, at least the inner sheath cross sectional element will be thermoplastic elastic polymeric compositions. Elastic polymers useful in making extruded fibers may be any suitable elastic fiber forming resin including, for example, include elastic polyesters, elastic polyurethanes, elastic polyamides, elastic copolymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and Where B is an elastic polymer midblock such as a conjugated diene or a lower alkene polymer such as for example polystyrene-poly(ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly(ethylene-propylene)-styrene-poly(ethylene-propylene) or SEPSEP block copolymer. These A-B-A' and A-B-A-B copolymers are available in several different formulations from Kraton Polymers U.S., LLC, of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al entitled "Elastic Substantially Linear Olefin Polymers". Also useful are certain elastic polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from the ExxonMobil Chemical Company of Houston, Tex., as well as blends.

The multicomponent fibers of the invention may desirably be utilized as or as part of many types of nonwoven webs which are known in the art, such as for example meltspun web production processes such as meltblowing and spunbonding processes, and staple or cut-fiber web production processes such as airlaying and carded web processes. Spunbond type fibers and spunbond nonwoven web production processes are highly desirable processes for forming the multicomponent fibers and nonwoven webs containing the multicomponent fibers.

Generally described, a spinneret for producing multicomponent fibers in such as a spunbond web production process may include a housing containing a spin pack which includes a plurality of plates stacked one on top of the other and having a pattern of openings arranged to create flow paths for directing the polymeric compositions of the cross sectional elements separately through the spinneret. An exemplary spin pack for producing multicomponent such as sheath-and-core fibers is described in U.S. Pat. No. 5,989,004 to Cook, the entire contents of which are incorporated herein by reference. In addition, production equipment for making hollow fibers is known in the art, such as is disclosed in PCT Publication No. WO 00/44411A1, published Aug. 3, 2000, which is incorporated herein by reference in its entirety. The apparatus and method for producing a treated fiber described in U.S. Pat. No. 6,350,399 to Cook et al., incorporated herein by reference, may be useful in conjunction with conventional sheath-core or hollow fiber spinning apparatus for producing a thin first cross sectional element (outer sheath element) such as is shown in FIGS. 3 and 4 by applying a thin "treatment" of thermoplastic polymeric composition onto the outer surface of either hollow fiber (to produce the embodiment shown in FIG. 3) or onto the outer surface of a sheath-and-core type fiber (to produce the embodiment shown in FIG. 4).

In addition, production equipment designed specifically for the making of sheath/sheath/filled-core fibers, and hollow multicomponent fibers such as hollow sheath-and-core type fibers (that is, a hollow space in the center of the fiber, surrounded by multiple sheaths) are known in the art and may desirably be used. Examples include the apparatus for making hollow sheath-core fibers disclosed in, for example, U.S. Pat. Nos. 5,320,512 and 6,746,226 to Moore and U.S. Pat. No. 5,904,982 to Kent et al.

As a specific example of an embodiment of the multicomponent fiber, a multicomponent fiber such as the one illustrated in FIG. 1 may be produced as follows. A commercially available substantially inelastic thermoplastic polymeric composition such as Exxon 3155 polypropylene polymer (available from the ExxonMobil Chemical Company of Houston, Tex.) may be used for the first cross sectional element (outer sheath element) of the multicomponent fiber by melting the polymer in a first extruder and supplying the molten polymer extrudate through a first polymer supply pipe to a spinpack and fiber spinning capillary such as the aforementioned spinpack disclosed in U.S. Pat. No. 5,108,820 to Moore, Sr. A commercially available thermoplastic elastic polymeric composition such as the styrenic block copolymer designated KRATON G2755 (available from KRATON Polymers, U.S., LLC of Houston, Tex.) may be used for the second cross sectional element (inner sheath element) of the multicomponent fiber by melting the elastic polymer in a second extruder and supplying the molten elastic polymer extrudate through a second polymer supply pipe to the spinpack and capillary assembly. The two polymeric extrudates travel separately through the spinpack assembly to be coextruded at the spinning capillary as a hollow sheath-core fiber.

At the same time, air or an inert gas may be separately supplied to the spinneret assembly to produce the hollow space element (third cross sectional element) inside of the second cross sectional element. The two polymers and inert gas are then extruded together in fiber form. Although this example was described above with respect to producing a single multicomponent fiber, it should be noted that for efficiency of production, the various polymeric components would typically be delivered to a plurality of extrusion capillaries so that many fibers are formed at the same time. The fibers, once extruded, would then be cooled or quenched from the molten state by blowing quench air across the fibers as they exit from the surface of the spinpack and spinneret. The fibers may then be fed into a pneumatic fiber drawing unit such as is known in the art to be drawn or attenuated to a final desired fiber size or diameter. After the fibers exit the fiber drawing unit they are collected into a nonwoven web of loose multicomponent fibers upon a moving screen or other foraminous collecting surface. Following collection, the web may be consolidated by a bonding method known in the art such as, for example thermal point bonding, and wound up onto a roll for storage. As an alternative to being wound up for storage, the nonwoven web may be directed to further processing operations, product forming or conversion operations, and the like. As an alternative to being drawn pneumatically and deposited as a nonwoven web, the fibers may also be drawn mechanically and wound up onto spindles, formed into yarns, or cut into staple length fibers, etc.

In addition to the thermal point bonding method mentioned above, it is known to bond nonwoven fibrous webs by various methods and any suitable method may be used. Examples include adhesive bonding, through air bonding, ultrasonic bonding, and entanglement bonding such as hydroentangling with water jets or mechanical needling, and the like. A fibrous nonwoven web comprising the multicomponent sheath-and-core fibers may desirably have a basis weight of from about 5 gsm or less to about 100 gsm, or greater. More specifically, where used in limited-use or single-use type disposable articles, such a fibrous nonwoven web may desirably have a basis weight from about 5 gsm to about 68 gsm, and still more desirably from about 5 gsm to about 34 gsm. Because elastic-containing materials are often expensive to produce, the basis weight of elastic material utilized is desirably of as low a basis weight as is possible while still providing the desired elastic properties, such as extensibility or stretch and recovery, to the material.

As examples of further possible processing operations, various processing finishing steps known in the art such as web slitting, stretching or treating, or lamination of a nonwoven fabric into a composite with other materials, such as films or other nonwoven layers, may be performed. Examples of laminates include bonding a fibrous nonwoven web comprising the multicomponent sheath-and-core fibers to other web layers such as films, such as breathable or non-breathable films as are known in the art, which films may be elastic or substantially inelastic; bonding the fibrous nonwoven web to other nonwoven webs such as elastic or inelastic spunbond web layer, meltblown web layers, carded webs layers, and combinations of the foregoing. Examples of nonwoven web treatments include electret treatment to induce a permanent electrostatic charge in the web, or in the alternative antistatic treatments. Another example of web treatment includes treatment to impart wettability or hydrophilicity to a web comprising hydrophobic thermoplastic material. Wettability treatment additives may be incorporated into the polymer melt as an internal treatment, or may be added topically at some point following fiber or web formation. Still another example of nonwoven web treatment includes treatment to impart repellency to low surface energy liquids such as alcohols, aldehydes and ketones. Examples of such liquid repellency treatments include fluorocarbon compounds added to the web or fibers of the web either topically or by adding the fluorocarbon compounds internally to the thermoplastic melt from which the fibers are extruded.

The elastic-containing multicomponent sheath-and-core fibers and nonwoven fibrous webs described herein are highly suited for use in medical care products, protective wear garments, personal care products and veterinary products. Examples of such products include, but are not limited to, medical and health care products such as surgical drapes, gowns and bandages, protective workwear garments such as coveralls and lab coats, and infant, child and adult personal care absorbent products such as diapers, training pants, incontinence garments and pads, sanitary napkins, wipes and the like. The multicomponent fibers can advantageously provide the desired fit or body conformance attributes of elastics while reducing the undesirable skin-feel attributes or properties of elastic polymers. In addition, the multicomponent fibers described herein can be highly advantageous from a production cost standpoint by reducing the overall amount of elastic polymer used.

While various patents have been incorporated herein by reference, to the extent there is any inconsistency between incorporated material and that of the written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A multicomponent fiber comprising at least first, second and third cross sectional elements, wherein said first cross sectional element is an outer sheath, said second cross sectional element is an inner sheath arranged adjacent to said outer sheath and adjacent to said third cross sectional element, wherein said outer sheath comprises a thermoplastic polymeric composition and said inner sheath comprises a thermoplastic elastic polymeric composition, and wherein said multicomponent fiber has a diameter of about 30 microns or less.

2. The multicomponent fiber of claim 1 wherein said third cross sectional element is a core comprising a thermoplastic elastic polymeric composition.

3. The multicomponent fiber of claim 2 wherein said third cross sectional element thermoplastic elastic polymeric composition is a different composition than said inner sheath thermoplastic elastic polymeric composition.

4. The multicomponent fiber of claim 3 wherein said inner sheath thermoplastic elastic polymeric composition and said third cross sectional element thermoplastic elastic polymeric composition are each independently selected from the group consisting of elastic polyesters, elastic polyurethanes, elastic polyamides, elastic copolymers of ethylene and at least one vinyl monomer, elastic block copolymers, elastic polyolefins, and blends thereof.

5. The multicomponent fiber of claim 1 wherein said third cross sectional element is a hollow element.

6. The multicomponent fiber of claim 1 wherein said outer sheath comprises a thermoplastic substantially inelastic polymeric composition.

7. The multicomponent fiber of claim 3 wherein said outer sheath comprises a thermoplastic substantially inelastic polymeric composition.

8. The multicomponent fiber of claim 5 wherein said outer sheath comprises a thermoplastic substantially inelastic polymeric composition.

9. The multicomponent fiber of claim 5 wherein said inner sheath thermoplastic elastic polymeric composition is selected from the group consisting of elastic polyesters, elastic polyurethanes, elastic polyamides, elastic copolymers of ethylene and at least one vinyl monomer, elastic block copolymers, elastic polyolefins, and blends thereof.

10. The multicomponent fiber of claim 1 wherein said outer sheath comprises less than about 50 percent of the cross sectional area of said multicomponent fiber.

11. The multicomponent fiber of claim 10 wherein said outer sheath comprises less than about 35 percent of the cross sectional area of said multicomponent fiber.

12. The multicomponent fiber of claim 11 wherein said outer sheath comprises less than about 20 percent of the cross sectional area of said multicomponent fiber.

13. The multicomponent fiber of claim 5 wherein said outer sheath comprises less than about 35 percent of the cross sectional area of said multicomponent fiber.

14. The multicomponent fiber of claim 13 wherein said outer sheath comprises less than about 20 percent of the cross sectional area of said multicomponent fiber.

15. A nonwoven fabric comprising a plurality of the multicomponent fibers of claim 1.

16. A nonwoven fabric comprising a plurality of the multicomponent fibers of claim 3.

17. A nonwoven fabric comprising a plurality of the multicomponent fibers of claim 5.

18. A laminate material comprising the nonwoven fabric of claim 15 bonded to at least one addition web layer selected from the group consisting of films and nonwoven webs.

19. A laminate material comprising the nonwoven fabric of claim 16 bonded to at least one addition web layer selected from the group consisting of films and nonwoven webs.

20. A laminate material comprising the nonwoven fabric of claim 17 bonded to at least one addition web layer selected from the group consisting of films and nonwoven webs.

* * * * *